(12) United States Patent
Tanaka

(10) Patent No.: US 9,348,540 B2
(45) Date of Patent: May 24, 2016

(54) OUTPUT MANAGEMENT DEVICE, OUTPUT MANAGEMENT SYSTEM, AND OUTPUT MANAGEMENT METHOD

(71) Applicant: Saki Tanaka, Kanagawa (JP)

(72) Inventor: Saki Tanaka, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/406,947

(22) PCT Filed: Jun. 7, 2013

(86) PCT No.: PCT/JP2013/066408
§ 371 (c)(1),
(2) Date: Dec. 10, 2014

(87) PCT Pub. No.: WO2013/191087
PCT Pub. Date: Dec. 27, 2013

(65) Prior Publication Data
US 2015/0138594 A1 May 21, 2015

(30) Foreign Application Priority Data
Jun. 18, 2012 (JP) .................. 2012-137286

(51) Int. Cl.
*G06F 3/12* (2006.01)
*G06F 15/00* (2006.01)
(Continued)

(52) U.S. Cl.
CPC ............ *G06F 3/1204* (2013.01); *G06F 3/1259* (2013.01); *G06F 3/1267* (2013.01);
(Continued)

(58) Field of Classification Search
CPC ... G06F 3/1204; G06F 3/1259; G06F 3/1267; G06F 3/1288; G06F 15/17312; G06F 11/202; G06F 11/16; H04L 45/10; H04L 45/12; H04L 45/22; H04L 45/28; H04L 45/48; H04L 67/327; H04L 67/1034; H04L 67/1002

USPC ........ 358/1.11–1.18, 400–404; 707/674–687; 711/147–153, 158–162; 709/223–226, 709/238–242, 251, 252
See application file for complete search history.

(56) References Cited

U.S. PATENT DOCUMENTS

| | | | |
|---|---|---|---|
| 7,447,711 B2* | 11/2008 | Hara | G06F 11/2025 |
| 2004/0263870 A1* | 12/2004 | Itoh | G06F 3/204 358/1.1 |

(Continued)

FOREIGN PATENT DOCUMENTS

| | | |
|---|---|---|
| JP | 2000-181653 | 6/2000 |
| JP | 2002-287931 | 10/2002 |

(Continued)

OTHER PUBLICATIONS

International Search Report issued Jul. 16, 2013 in PCT/JP2013/066408 filed Jun. 7, 2013.

(Continued)

*Primary Examiner* — Chad Dickerson
(74) *Attorney, Agent, or Firm* — Harness, Dickey & Pierce, P.L.C.

(57) ABSTRACT

An output management device including: an acquiring unit that acquires a list of output data; a storage unit that stores sharing information of the data storage device; a first judgment unit that judges a state of a first output control device; a second judgment unit that judges the state of the second output control devices, when judged that the first output control device is not working and the data storage device is shared with the first and second output control device, and a setting unit that sets the output data possible to output when the first judgment unit judged that the first output control device is working or the second judgment unit judged that at least one of the second output control devices is working, and sets the output data impossible to output when the second judgment unit judged that all the second output control devices are not working.

7 Claims, 6 Drawing Sheets

(51) Int. Cl.
*G06F 11/20* (2006.01)
*G06K 15/00* (2006.01)

(52) U.S. Cl.
CPC .......... *G06F3/1288* (2013.01); *G06F 11/2041* (2013.01); *G06F 11/2046* (2013.01); *H04N 2201/0094* (2013.01)

(56) References Cited

U.S. PATENT DOCUMENTS

| | | | |
|---|---|---|---|
| 2007/0033540 A1* | 2/2007 | Bridges | G06F 17/30126 715/769 |
| 2009/0195822 A1* | 8/2009 | Hiraike | H04N 1/0037 358/1.15 |
| 2010/0103450 A1 | 4/2010 | Yanazume | |
| 2010/0118334 A1* | 5/2010 | Iwase | G06F 3/1204 358/1.15 |
| 2011/0271073 A1* | 11/2011 | Ikeda | G06F 11/1402 711/170 |
| 2011/0299122 A1 | 12/2011 | Kawakami | |

FOREIGN PATENT DOCUMENTS

| | | |
|---|---|---|
| JP | 2007-179197 | 7/2007 |
| JP | 2008-123047 | 5/2008 |
| JP | 2010-109588 | 5/2010 |
| JP | 2011-095894 | 5/2011 |
| JP | 2011-251513 | 12/2011 |
| JP | 2013/066408 | 6/2013 |

OTHER PUBLICATIONS

Written Opinion issued Jul. 16, 2013 in PCT/JP2013/066408 filed Jun. 7, 2013.

* cited by examiner

| JOB ID | USER ID | PRINT SETTING INFORMATION | SPECIFIED OUTPUT SERVER INFORMATION |
|---|---|---|---|
| 1 | A | DUPLEX PRINTING | OUTPUT SERVER 1 |
| 2 | A | SINGLE SIDED-PRINTING | OUTPUT SERVER 2 |
| 3 | A | SINGLE SIDED-PRINTING | OUTPUT SERVER 3 |
| 4 | A | SINGLE SIDED-PRINTING | OUTPUT SERVER 4 |

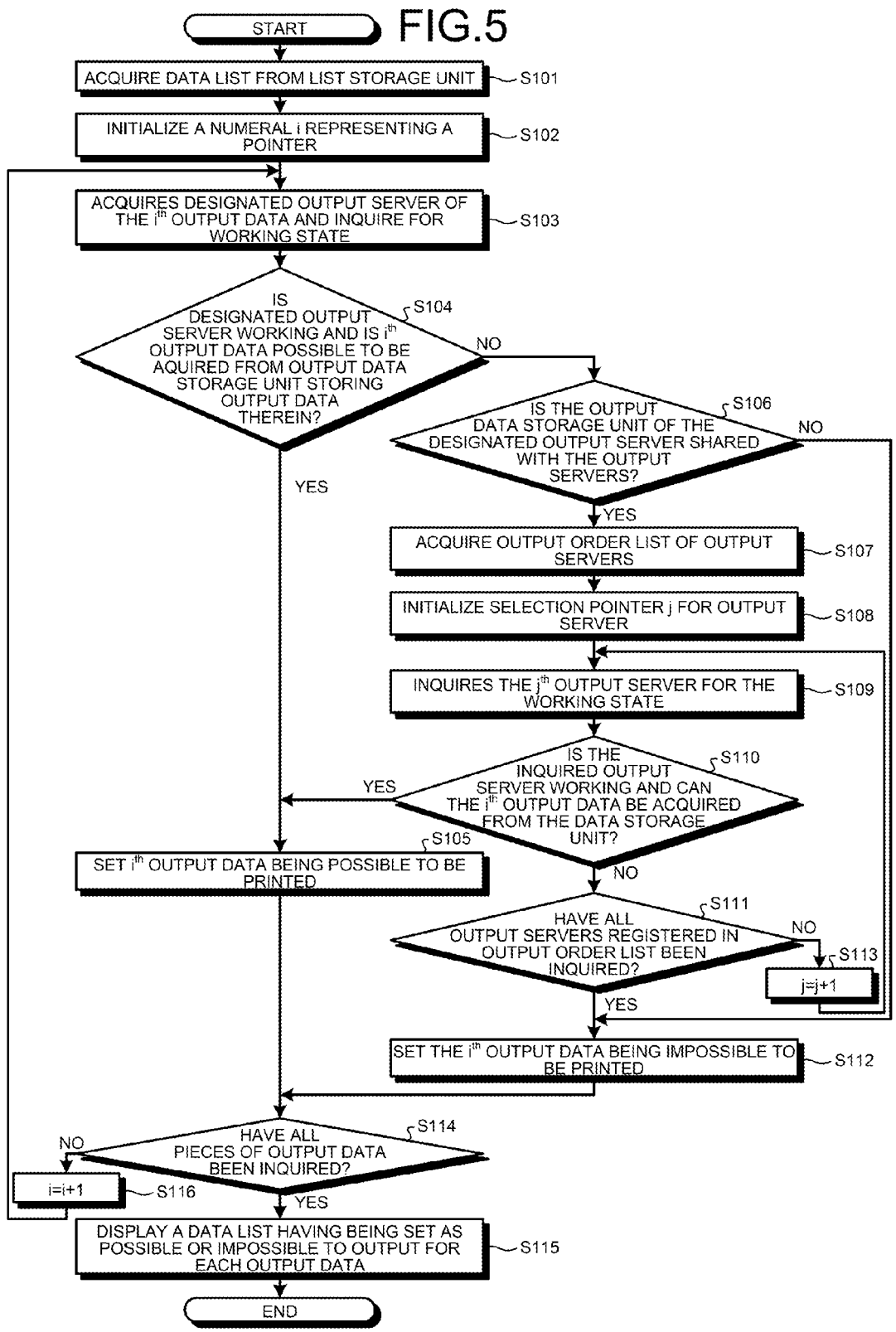

OUTPUT MANAGEMENT DEVICE, OUTPUT MANAGEMENT SYSTEM, AND OUTPUT MANAGEMENT METHOD

This application is a national phase under 35 U.S.C. §371 of PCI International Application No. PCT/JP2013/066408 which has an International filing date of Jun. 7, 2013, which claims priority to Japanese patent application number JP 2012-137286 filed Jun. 18, 2012.

TECHNICAL FIELD

The present invention relates to an output management device, an output management system, and an output management method.

BACKGROUND ART

Conventionally, there were pull print systems that do not promptly output data that are instructed to be output by a client terminal from a multifunction peripheral (MFP) or a printer, but temporally store the output data in a print server or the like for controlling output and perform printing later. In the pull print systems, with an ID card, password authentication, and the like, a user logs in the desired MFP to perform printing and selects desired data from among data list that is displayed after login. Then, the selected data is printed out from the MFP.

In such pull print systems, in addition to the data output, pieces of information (hereinafter, referred to as "core information") such as a unique ID, a print job name, a user name, and a print attribute of output data are stored in the print server. The MFP acquires a data list that is generated by core information and displays the data list.

The output data and the core information are stored not in the print server but in another storage device such as a hard disk, and the information can be read out from and written into the storage device from another print server. In this configuration, the data stored in the storages are managed in an integrated manner. As a result, an administrator advantageously can easily change storages of the core information.

When the print server and the data storage device are configured as different hardware units as described above, for example, if the print server is suspended and the storage device storing the core information is operating, although the MFP can acquire and display the data list, the MFP actually fails to perform printing. In this case, it is difficult for the user of the MFP to recognize the fact that the MFP cannot perform printing because the MFP displays the data list. That leads decreasing of an entire efficiency of the printing system.

The present invention has been made in view of the above-mentioned circumstances and an object thereof is to provide an output management device that can suppress decreasing of the entire efficiency of the printing system.

DISCLOSURE OF INVENTION

According to an aspect to the present invention, an output management device connected to at least one of output control devices that receive output data transmitted from a terminal and perform output processing of the output data, and at least one of a data storage devices connected to the output control device is provided. The output management device includes: an acquiring unit that acquires a data list as a list of the output data stored in either the data storage device; a storage unit that stores therein sharing information indicating the output control devices sharing either the data storage device; a first judgment unit that judges an working state of a first output control device designated as an output destination of the output data for each piece of the output data contained in the acquired data list; a second judgment unit that judges the working state of each of the second output control devices, when it has been judged that the first output control device is not working and the data storage device is shared with the first output control device and second output control device, and a setting unit that sets the output data being possible to output when the first judgment unit has judged that the first output control device is working or the second judgment unit has judged that at least one of the second output control devices is working, and sets the output data being impossible to output when the second judgment unit has judged that all the second output control devices are not working.

BRIEF DESCRIPTION OF DRAWINGS

FIG. 5 is a exemplary flowchart illustrating processing of determining a display mode of the data list on the MFP in the embodiment;

BEST MODE(S) FOR CARRYING OUT THE INVENTION

In the following, some embodiments of an output management device are described with reference to the accompanying drawings.

Figure 1:
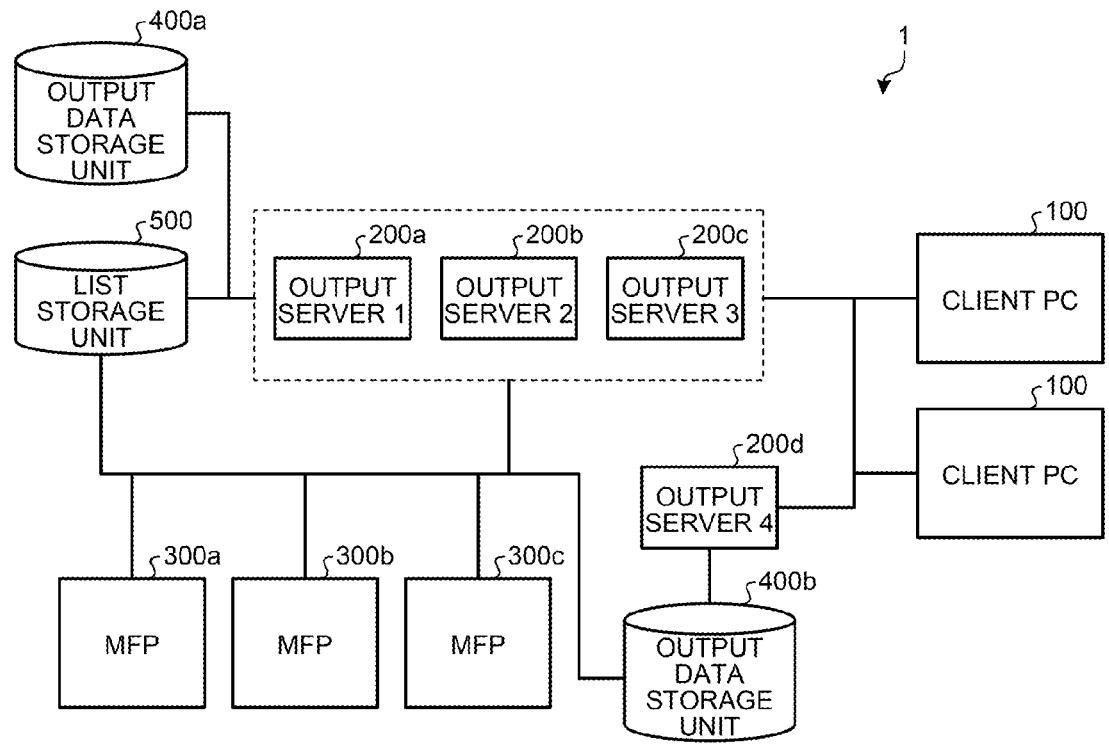
FIG. 1 is a schematic block diagram illustrating an output management system in an embodiment of the present invention.

FIG. 1 shows an example configuration of an output management system including an output management device according to an embodiment. In the embodiment, the output management device is mounted on an MPF. An output management system 1 includes client PCs 100, output servers (200a, 200b, 200c, 200d) as output control devices, MFPs (300a, 300b, 300c), output data storage units (400a, 400b), and a list storage unit 500. It should be noted that the output data storage unit (400a, 400b) and the list storage unit 500 may be mounted on the same hardware.

In a pull print system, a user designates one of the output servers (200a, 200b, 200c, 200d) to transmit from the client PC 100 data to be printed out the MFP. The transmitted data to be printed is stored in the data storage units (400a, 400b) that have been associated with the output servers (200a, 200b, 200c, 200d). In the embodiment, the storage areas of data to be printed in the output servers (200a, 200b, 200c) are set to the output data storage unit 400a, and the storage area of output data in the output server 200d is set to the output data storage unit 400b. The output servers (200a, 200b, 200c) share the output data storage unit 400a. Note that an administrator of the system can change the setting manually.

Each output servers (200a, 200b, 200c, 200d) stores core information, for example a unique ID, a print job name, a user name, print attribute information, and the like, in the list storage unit 500. When printing the data, the user can log in one of the MFPs (300a, 300b, 300c) by using an IC card, for example. The MFPs (300a, 300b, 300c) acquire, from the list storage unit 500, a data list which is the list of the corresponding output data based on the user name of the user that has been acquired at the login. The MFPs thereafter display the data list on a display unit.

Figure 2:
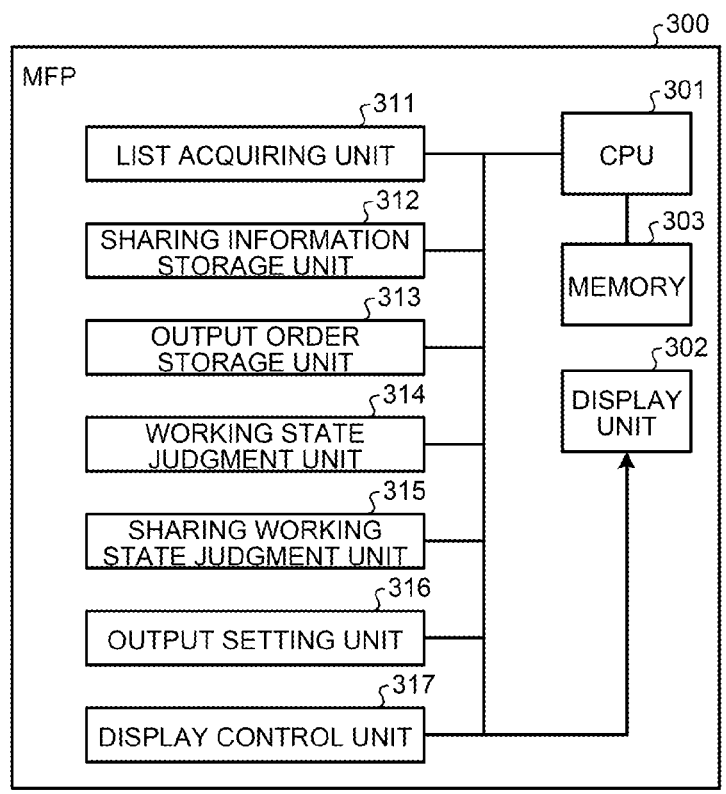
FIG. 2 is a schematic diagram illustrating the output management system mounted on an MFP in the embodiment.

Next, a functional configuration of the MFP 300 is described with reference to FIG. 2. As illustrated in FIG. 2, the MFP 300 includes a central processing unit (CPU) 301, a display unit 302, a memory 303, a list acquiring unit 311, a sharing information storage unit 312, an output order storage unit 313, an working state judgment unit 314, a sharing working state judgment unit 315, an output setting unit 316, and a display control unit 317. The CPU 301 reads out the respective functions of the sharing information storage unit 312, the working state judgment unit 314, the sharing working state judgment unit 315, the output setting unit 316, and the display control unit 317 and executes them to operate on the memory 303.

Figures 3, 4:
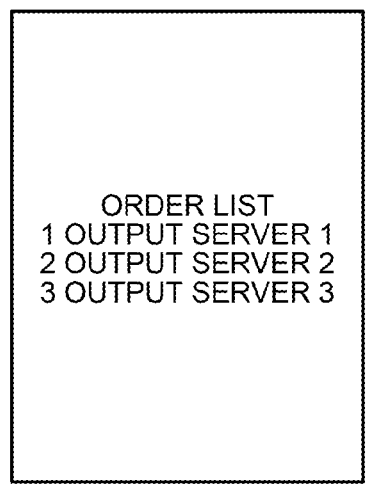
FIG. 3 is an example of a data list in the embodiment.
FIG. 4 is an example of an order list in the embodiment.

The list acquiring unit 311 acquires a data list of output data from the list storage unit 500 via a network. The list acquiring unit 311 may acquire a list of all pieces of output data indicated by core information that are stored in the list storage unit 500. Alternatively, the list acquiring unit 311 may acquire only a list of output data containing the name of user who is logging in the MFP 300. FIG. 3 shows an example of the acquired data list. As illustrated in FIG. 3, the data list contains job IDs, user IDs, pieces of print setting information, and pieces of designated output server information. The job ID is an ID assigned to the output data when the user transmits an output direction from the client PC 100. The user ID is to identify the user who has transmitted the output data from the client PC 100. The print setting information indicates print conditions such as duplex printing/single sided-printing, the number of sheets to be printed, and specification of layout. The designated output server information indicates any one of the output servers (200a, 200b, 200c, 200d) designated when the user transmits the output data from the PC 100. The display control unit 317 controls to display the acquired data list on the display unit 302.

The sharing information storage unit 312 stores therein information indicating which output servers (200a, 200b, 200c, 200d) share the output data storage units (400a, 400b). In the embodiment, the sharing information storage unit 312 stores therein information indicating that the output servers (200a, 200b, 200c) share the output data storage unit 400a. The administrator of the system may manually update the share information stored in the sharing information storage unit 312.

The output order storage unit 313 stores therein the order of the output servers (200a, 200b, 200c) to which the user transmits the output command from the MFPs (300a, 300b, 300c) at the time of printing. Note that the output servers (200a, 200b, 200c) store the same output data storage unit 400a as stored in the sharing information storage unit 312. It should be noted that the stored transmission order is information to be used for determining the order of designating the output servers (200a, 200b, 200c, 200d) to alternatively perform output processing when the designated output server contained in the above-mentioned core information is not working. FIG. 4 shows an example of the order list of the MFP. In the order list illustrated in FIG. 4, an output server 1 has the highest priority and an output server 3 has the lowest priority.

The working state judgment unit 314 judges whether the output server (200a, 200b, 200c, 200d) designated as the designated output server of the output data existing in the acquired data list is working or not. For example, a method can be employed, in which the working state judgment unit 314 transmits a signal to the output server (200a, 200b, 200c, 200d) and judges whether it receives a return signal within a predetermined time or not. When pieces of output data are present in the data list, the working state judgment unit 314 judges the working state of the designated output server for each data.

When the working state judgment unit 314 has determined that the designated output server is not working, the sharing working state judgment unit 315 judges the working states of the output servers in order according to the priority indicated in the order list, from among the output servers (200a, 200b, 200c, 200d) that share the output data storage unit (400a, 400b) being stored in the sharing information storage unit 312.

When at least any one of the judged output servers has been determined to be in the working state as results of judges by the working state judgment unit 314 and the sharing working state judgment unit 315, the output setting unit 316 sets the output data to be capable of being output. On the other hand, when the working state judgment unit 314 and the sharing working state judgment unit 315 have determined that all the output servers (200a, 200b, 200c, 200d) are not working, the output setting unit 316 sets the output data to be incapable of being output.

There may be the case where even if the output servers (200a, 200b, 200c, 200d) are working, the output data storage units (400a, 400b) are shutdown and the output data to be printed cannot be acquired by the output servers. There may be also the case where the selected data is not stored in at least one of the output data storage units (400a, 400b) as an inquiry destination. If at least one of the output servers (200a, 200b, 200c, 200d) receives a notification indicating that the working state thereof is to be judged by the working state judgment unit 314 or the sharing working state judgment unit 315, at least one of the output server (200a, 200b, 200c, 200d) inquires at least one of the output data storage units (400a, 400b) as the data storage area for the selected output data at the time of the judgment and judges whether at least one of the output data storage units (400a, 400b) is working or not. Note that the data storage area of each output servers (200a, 200b, 200c, 200d) is set to the output data storage unit (400a, 400b) previously.

When either the output data storage unit (400a, 400b) is working, the output data storage unit (400a, 400b) gives a response whether the output server (200a, 200b, 200c, 200d) can acquire the selected output data or not. When at least one of the output servers (200a, 200b, 200c, 200d) has not received the response from the output data storage unit (400a, 400b) or has received a response indicating that the selected output data is not stored, at least one of the output servers (200a, 200b, 200c, 200d) transmits information that the output servers cannot acquire the output data, to the working state judgment unit 314 and the sharing working state judgment unit 315 that have been inquired, even if the output server (200a, 200b, 200c, 200d) is working. Also in this case, the output setting unit 316 sets the output data being impossible to output.

Figure 6A:
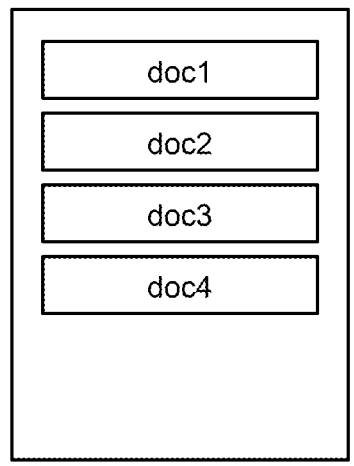
FIG. 6A is an example of the display mode of the data list in the embodiment.
Figure 6B:
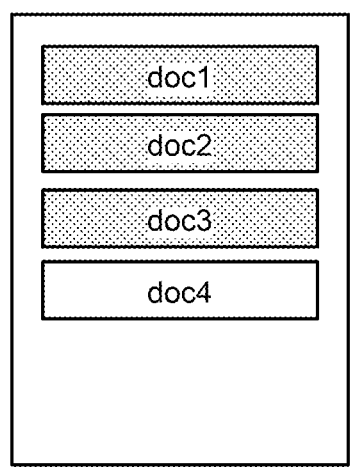
FIG. 6B is other example of the display mode of the data list in the embodiment.
Figure 6C:
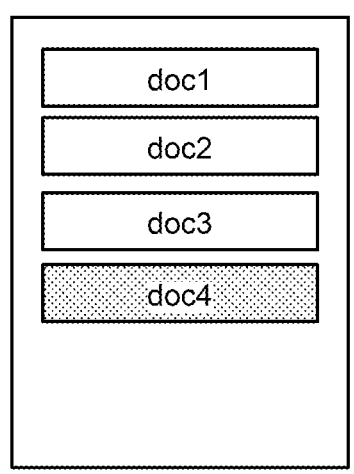
FIG. 6C is still other example of the display mode of the data list in the embodiment.

The display control unit 317 controls a display form or manner of a screen on the display unit 302. Furthermore, the display control unit 317 displays a data list reflecting settings made by the output setting unit 316, for each output data indicating possible or impossible to output. Specifically, the output data that has been set as impossible to output is displayed so as to disable user to select the output data, for example, with dark color on the display, while the output data that has been set as possible to output is displayed so as to enable user to select the output data with common color on the display. FIG. 6A to FIG. 6C show an example of the display form or manner of the data list. In the embodiment, pieces of data of doc 1 to doc 4 respectively correspond to job IDs 1 to 4 illustrated in FIG. 3.

FIG. 6A illustrates that all of output data are possible to output. In this case, the state is shown below. All pieces of output data are able to be printed.
1. At least one of the output servers (200a, 200b, 200c) is working.
2. The output server 200d is working.
3. The output data storage units (400a, 400b) are working, and the pieces of selected output data are present in the corresponding output data storage units (400a, 400b).

FIG. 6B illustrates that the doc 1 to doc 3 are impossible to output and the doc 4 is possible to output among the pieces of output data. In this case, the state is shown below. Only the output data of the doc 4 is able to be printed.
1. All the output servers (200a, 200b, 200c) are not working, the output data storage unit 400a is not working, or none of output data of the doc 1 to doc 3 are stored in the output data storage unit 400a.
2. The output server 200d is working and the output data storage unit 400b is working.

FIG. 6C illustrates that the doc 1 to doc 3 are possible to output and the doc 4 is impossible to output among the pieces of output data. In this case, the state is shown below. The pieces of output data of the doc 1 to doc 3 are able to be printed.
1. At least one of the output servers (200a, 200b, 200c) is working and the output data storage unit 400a is working.
2. The output server 200d is not working, the output data storage unit 400b is not working, or the doc 4 is not stored in the output data storage unit 400b.

Next, a flow of processing of determining the display form of the data list on the MFP 300 is described with reference to FIG. 5. The processing is started from the time when the user has logged in the MFP 300 to perform printing. The list acquiring unit 311 of the MFP 300 receives core information of the output data transmitted by the user from the list storage unit 500 and acquires the data list (Step S101). Then, a numeral i, which represents a pointer, is initialized (Step S102). Here, the numeral i is the pointer indicating the output data contained in the acquired data list and is an integer that satisfies with condition of 0<i≤the number of data contained in the data list.

Subsequently, the working state judgment unit 314 acquires the designated output server of the ith output data from the core information and inquires the output server for the working state thereof (Step S103). The working state judgment unit 314 judges whether the designated output server is working or not. The ith output data can be acquired from the output data storage unit (400a, 400b) storing the output data therein based on the response from the inquired output server (Step S104).

When it is determined that the designated output server is working and the ith output data can be acquired from the data storage unit (400a, 400b) (i.e., Yes at Step S104), the output setting unit 316 sets the ith output data being possible to be printed (Step S105). On the other hand, when it is determined that the designated output server is not working or the ith output data cannot be acquired from the data storage unit (400a, 400b) (i.e., No at Step S104), the sharing working state judgment unit 315 judges whether the output data storage unit (400a, 400b) of the designated output server is shared with either the output servers (200a, 200b, 200c, 200d) or not, from the sharing information storage unit 312 (Step S106).

When it is determined that the output data storage unit (400a, 400b) of the designated output server is shared with either the output servers (200a, 200b, 200c, 200d) (i.e., Yes at Step S106), the sharing working state judgment unit 315 acquires the order list of the output servers (200a, 200b, 200c, 200d) sharing the output data storage unit (400a, 400b) (Step S107). Then, the sharing working state judgment unit 315 initializes a numeral j, which represents a pointer to specify the output server (Step S108). The numeral j is an integer that satisfies with condition of 0<j≤the number of servers contained in the order list.

Next, the sharing working state judgment unit 315 inquires the jth output server for the working state (Step S109). The sharing working state judgment unit 315 judges whether the inquired output server is working and the ith output data can be acquired from the data storage unit (400a, 400b) storing the output data therein, based on the inquiry result or not (Step S110). When it is determined that the inquired output server is working and the $i^{th}$ output data can be acquired from the data storage unit (400a, 400b) storing the output data therein (i.e., Yes at Step S110), the process proceeds to Step S105. On the other hand, when it is determined that the inquired output server is not working or the $i^{th}$ output data cannot be acquired from the data storage unit (400a, 400b) storing the output data therein (i.e., No at Step S110), it is judged whether all the output servers registered in the order list have been inquired (Step S111).

When it is determined that all the output servers registered in the order list have been inquired, that is, it is determined that the numeral j reaches the predetermined number of servers contained in the order list (i.e., Yes at Step S111), the output setting unit 316 sets the ith output data being impossible to be printed (Step S112). On the other hand, when it is determined that all the output servers registered in the order list have not been inquired, (i.e., No at Step S111), the numeral j is incremented by one and processing from Step S109 are repeated (Step S113).

After the processing at Step S105 or Step S112, it is judged whether all pieces of output data present in the data list have been inquired or not (Step S114). When it is determined that all pieces of output data present in the data list have been inquired (i.e., Yes at Step S114), the display control unit 317 controls the display unit 302 in the display form to display a data list reflecting settings made by the output setting unit 316, for each output data indicating possible or impossible to output. (Step S115). On the other hand, when it is determined that all pieces of output data present in the data list have not been inquired (i.e., No at Step S114), the numeral i is incremented by one and the processing are repeated from Step S103 on the subsequent output data (Step S116).

In the output management device according to the embodiment as described above, even when the output server designated at the transmission of the output data is not working, if another output server sharing the output data storage unit is working, information indicating that the output data is possible to be printed can be displayed for the user. By sending a command to execute printing, the output data can be printed, so that decrease of the working rate of the entire printing system can be significantly suppressed.

It should be noted that the stored transmission order is information to be used for determining the order of designating the output servers (200a, 200b, 200c, 200d) to alternatively perform output processing when the designated output server contained in the above-mentioned core information is not working. Furthermore, when the designated output server is not working at the time of the transmission of the output data, it is possible to select an alternative output server from among the output servers that execute printing processing based on the priority of the order list. Therefore, for example, it is possible to prioritize the output server having high processing capability, and design the entire system in consideration of arrangement of the MFP, and so on. Consequently, usability of the system management improves.

Alternative Embodiment

Figure 7:
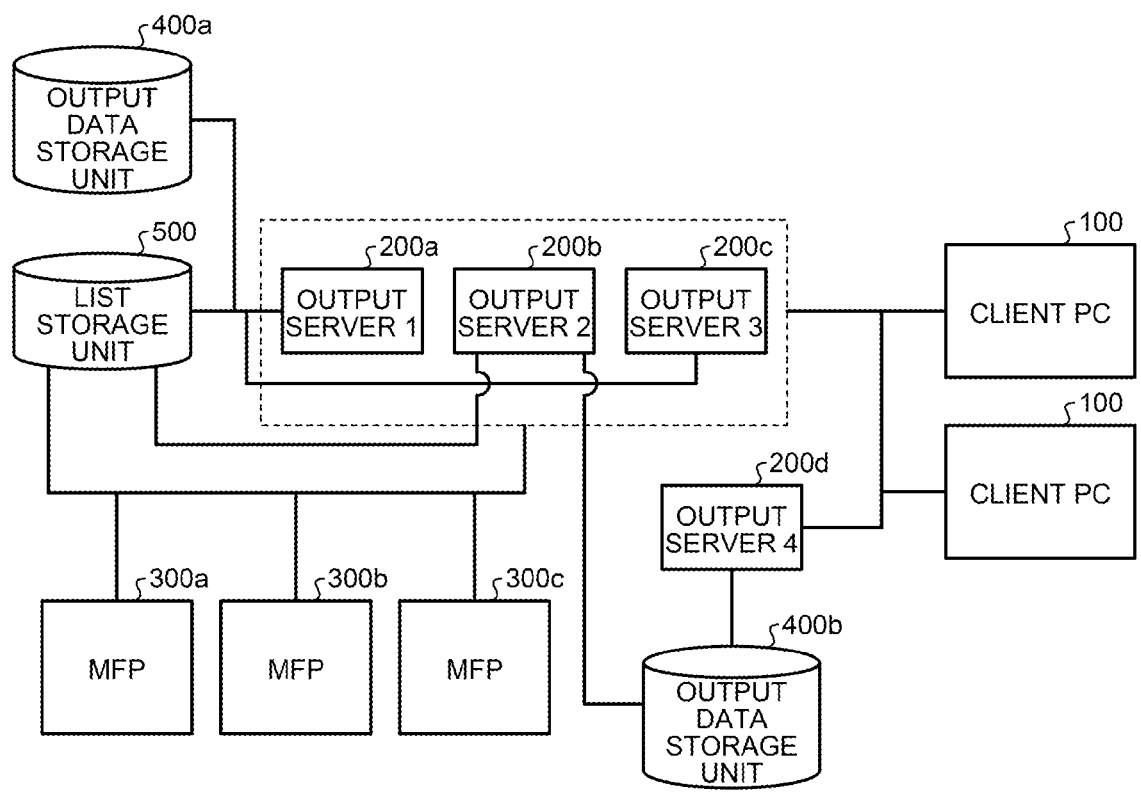
FIG. 7 is a block diagram illustrating an output management system in an altarnetive embodiment of the present invention.

Next, an alternative embodiment of the present invention will be described below. FIG. 7 shows output management system according to this embodiment. In this embodiment, the output servers (200a, 200c) are set so as to share the output data storage unit 400a, and the output servers (200b, 200d) are set so as to share the output data storage unit 400b. That is, the output data storage unit 400b is designated as a storage area of the data of the output server 200b.

Figure 8A:
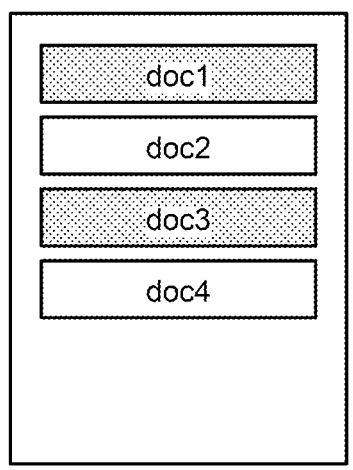
FIG. 8A is an example of the display mode of a data list in the second embodiment.

Here, as an example, it is assumed that the output servers (200a, 200c) are not working and the output server 200b is working. In this example, since the output server 200b is working, information indicating that the output server is working is provided in response to the inquiry from the sharing working state judgment unit 315. However, the doc 1 and the doc 3 are not stored in the output data storage unit 400b as the storage area of the data of the output server 200b, information indicating that these pieces of output data cannot be acquired is responded. On the other hand, the doc 2 can be acquired from the output data storage unit 400b. As illustrated in FIG. 8A, the display control unit 317 displays the state where the doc 1 and the doc 3 are impossible to be printed and the doc 2 and the doc 4 are possible to be printed.

Furthermore, as another example, it is assumed that the output servers 200a and 200c are working and the output server 200b is not working. In this example, the doc 1 and the doc 3 are set as possible to be printed. For the doc 2, since the output server 200b is not working, the output servers (200a, 200c) are inquired in order. While the output server 200a is working, data of the doc 2 is not present in the output data storage unit 400a as the storage area of the data of the output server 200a. Thus, information indicating that the output data of the doc 2 cannot be acquired is provided from the output servers (200a, 200c).

Figure 8B:
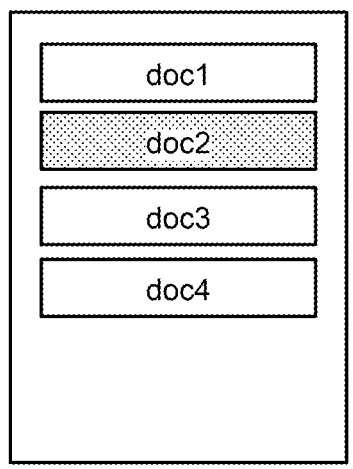
FIG. 8B is a view illustrating another example of the display mode of the data list in the second embodiment.

As illustrated in FIG. 8B, the display control unit 317 displays a state where the doc 1, the doc 3, and the doc 4 are possible to be printed and the doc 2 is impossible to be printed.

In the alternative embodiment, even when share setting of the data storage area and the actual storage area of the data of the output server are different, it can be judged whether the output data can be acquired based on the actual data storage area or not. Accordingly, erroneous display concerning about output data being possible or impossible to be printed can be effectively prevented.

It should be noted that the output management device in the above-mentioned embodiments includes a control device such as a CPU, storage devices such as a read only memory (ROM) and a random access memory (RAM), external storage devices such as a hard disk drive (HDD) and a CD drive device, a display device such as a display unit, and input devices such as a keyboard and a mouse. The output management device in the above-mentioned embodiments has a hardware configuration using a common computer.

Computer programs to be executed in the output management device in the above-mentioned embodiments are provided by being recorded in a recording medium that can be read by a computer, such as a compact disc read only memory (CD-ROM), a flexible disk (FD), a CD recordable (CD-R), or a digital versatile disk (DVD), in an installable or executable file format.

The programs to be executed in the output management device in the above-mentioned embodiments may be configured to be provided by being stored on a computer connected to a network such as the Internet and being downloaded via the network. Alternatively, the programs to be executed in the output management device in the above-mentioned embodiments may be configured to be provided or distributed via a network such as the Internet.

The programs to be executed in the output management device in the above-mentioned embodiments may be configured to be provided by being incorporated in a read-only memory (ROM) or the like previously. The programs to be executed in the output management device in the above-mentioned embodiments have a module configuration including the above-mentioned parts. As an example of hardware, a central processing unit (CPU) (processor) loads the programs from the above-mentioned storage medium and executes the programs, so that the above-mentioned parts are loaded on a main storage device. With this, the above-mentioned parts are generated on the main storage device.

It should be noted that although the output management device is mounted on the MFP in the above-mentioned embodiments, the output management device can be applied to any image forming apparatuses such as a copying machine, a printer, a scanner device, and a facsimile device.

The invention claimed is:

1. An output management device connected to a plurality of output control devices configured to receive output data and perform output processing of the output data, and connected to at least one data storage device connected to the output control devices, comprising:
  an acquiring unit to acquire a data list, the data list listing items of the output data transmitted from a terminal and stored in the at least one data storage device;
  a storage unit to store sharing information indicating a portion of the output control devices, the portion of the output control devices sharing a same data storage device of the at least one storage device;
  a first judgment unit to judge a working state of a first output control device of the portion of the output control devices, the first output control device designated as an output destination of a selected item of the output data;
  a second judgment unit to judge a working state of second output control devices of the portion of the output control devices, if the working state of the first output control device indicates the first output control device is not working; and
  a setting unit to set the selected item being possible to output using the same storage device if the working state of the first output control device indicates the first output control device is not working and the working state of the second output control devices indicates that at least one of the second output control devices is working, and set the selected item to not output when working state of the second output control devices indicates that all the second output control devices are not working, a display unit to display the data list and receive a selection of the data list by a user, and a display control unit to cause the display unit to display items of the output data having been set as possible to output in a selectable manner and display items of the output data having been set as to not output in an unselectable manner.

2. The output management device set forth in claim 1, further comprising:

an order storage unit to store an order of processing the output data in the output control devices, wherein the second judgment unit is to judge the working states of the second output control devices in accordance with the order.

3. The output management system device set forth in claim 1, wherein the first judgment unit and the second judgment unit specify the output data and inquire the output control devices for judgment, at least one of the first judgment unit and the second judgment unit to receive a determination result from the output control devices, the determination result indicating whether the output data specified is accessible from the at least one data storage devices storing the output data, and the setting unit to set the output data to not output if the determination result indicates that the output data is not accessible.

4. The output management device set forth in claim 3, further comprising:

an order storage unit to store an order of processing the output data in the output control devices, wherein the second judgment unit is to judge the working states of the second output control devices in accordance with the order.

5. An output management method of, an output management device connected to a plurality of output control devices configured to receive output data and perform output processing of the output data, and connected to at least one data storage device connected to the output control devices, comprising:

acquiring a data list, the data list listing items of the output data transmitted from a terminal and stored in the at least one data storage device;

storing sharing information indicating a portion of the output control devices, the portion of the output control devices sharing a same data storage device of the at least one storage device;

first judging a working state of a first output control device of the portion of the output control devices, the first output control device designated as an output destination of a selected item of the output data;

second judging a working state of second output control devices of the portion of the output control devices, if the working state of the first output control device indicates the first output control device is not working; and setting the selected item being possible to output using the same data storage device if the working state of the first output control device indicates the first output control device is not working and the working state of the second output control devices indicates that at least one of the second output control devices is working, and set the selected item to not output when the working state of the second output control devices indicates that all the second output control devices are not working, displaying the data list on a display unit and receiving a selection of the data list by a user, and controlling the display unit to display items having been set as possible to output in selectable manner and display items having been set as to not output in an unselectable manner.

6. The output management method set forth in claim 5, further comprising:

storing an order of processing the output data in the output control devices, wherein the second judging judges the working states of the second output control devices in accordance with the order.

7. An output management device connected to a plurality of output control devices configured to receive output data and perform output processing of the output data, and connected to at least one data storage device connected to the output control devices, the output management device comprising:

a processor configured to execute instructions in at least one memory such that the processor is configured to, acquire a data list, the data list listing items of the output data transmitted from a terminal and stored in the at least one data storage device;

store sharing information indicating a portion of the output control devices, the portion of the output control devices sharing a same data storage device of the at least one storage device;

judge a working state of a first output control device of the portion of the output control devices, the first output control device designated as an output destination of a selected item of the output data;

judge a working state of second output control devices of the portion of the output control devices, if the working state of the first output control device indicates the first output control device is not working;

the selected item being possible to output using the same storage device if the working state of the first output control device indicates the first output control device is not working and the working state of the second output control devices indicates that at least one of the second output control devices is working, and set the selected item to not output when the second judgment unit has judged that all the second output control devices are not working;

display the data list on a display unit and receiving a selection of the data list by a user; and control the display unit to display items having been set as possible to output in selectable manner and display items having been set as to not output in an unselectable manner.

\* \* \* \* \*